United States Patent
Hedlund

(10) Patent No.: US 12,178,185 B2
(45) Date of Patent: Dec. 31, 2024

(54) SHORT MILK TUBE VENT PLUG FOR A DAIRY ANIMAL MILKER UNIT

(71) Applicant: GEA Farm Technologies, Inc., Romeoville, IL (US)

(72) Inventor: Nathan V. Hedlund, Galesville, WI (US)

(73) Assignee: GEA Farm Technologies, Inc., Romeoville, IL (US)

( * ) Notice: Subject to any disclaimer, the term of this patent is extended or adjusted under 35 U.S.C. 154(b) by 422 days.

(21) Appl. No.: 17/575,769

(22) Filed: Jan. 14, 2022

(65) Prior Publication Data

US 2023/0225282 A1    Jul. 20, 2023

(51) Int. Cl.
| | |
|---|---|
| *A01J 5/04* | (2006.01) |
| *A01J 5/08* | (2006.01) |
| *F16L 55/105* | (2006.01) |
| *F16L 55/11* | (2006.01) |

(52) U.S. Cl.
CPC ............ *A01J 5/048* (2013.01); *A01J 5/044* (2013.01); *F16L 55/105* (2013.01); *F16L 55/1141* (2013.01); *A01J 5/08* (2013.01)

(58) Field of Classification Search
CPC .... A01J 5/048; A01J 5/044; A01J 5/08; F16L 55/105; F16L 55/1141; F16L 55/11; F16L 55/07
USPC ................. 119/14.36; 4/295; 138/89, 90, 91
See application file for complete search history.

(56) References Cited

U.S. PATENT DOCUMENTS

| | | | | |
|---|---|---|---|---|
| 906,591 | A | * 12/1908 | Weaver | A47K 1/14 4/295 |
| 1,301,992 | A | 4/1919 | Anderson | |
| 1,646,995 | A | * 10/1927 | Gagnon | A47K 1/14 4/295 |
| 2,099,884 | A | 2/1936 | Green | |

(Continued)

FOREIGN PATENT DOCUMENTS

| | | |
|---|---|---|
| CA | 2500708 A1 | 4/2004 |
| EP | 1549134 B1 | 6/2013 |

(Continued)

OTHER PUBLICATIONS

Notification of Transmittal of the International Search Report and the Written Opinion of the International Searching Authority for PCT application No. PCT/US2023/010677, dated Apr. 6, 2023, 11 pages.

(Continued)

*Primary Examiner* — Tye William Abell
*Assistant Examiner* — Maria E Graber
(74) *Attorney, Agent, or Firm* — BainwoodHuang

(57) ABSTRACT

An air vent plug assembly and milker unit short milk tube having an air vent plug assembly to improve milk flow characteristics through the short milk tube. The short milk tube includes a wall with an upstream end and a downstream end and defining a milk passage bore extending between the upstream end and the downstream end. The wall defines a vent plug mounting hole. A vent plug extends through the vent plug mounting hole and includes a cap, a shaft joined to the cap, and a barbed end joined to the shaft, the vent plug defining a vent passage to at least partially vent the milk passage bore. A flow dimple is defined in the barbed end and disposed in the milk passage bore.

22 Claims, 13 Drawing Sheets

(56) References Cited

U.S. PATENT DOCUMENTS

| | | | |
|---|---|---|---|
| 2,321,236 A * | 6/1943 | Parkin | A61J 9/04 215/11.1 |
| 2,341,953 A | 2/1944 | Scott | |
| 2,513,627 A | 7/1950 | Dinesen | |
| 2,664,809 A | 1/1954 | Morell | |
| 3,014,455 A | 12/1961 | Olander | |
| 3,074,837 A | 1/1963 | Flax | |
| 3,079,891 A | 3/1963 | Miller | |
| 3,476,085 A * | 11/1969 | Noorlander | A01J 5/08 119/14.36 |
| 3,659,558 A | 5/1972 | Noorlander | |
| 3,713,423 A | 1/1973 | Sparr | |
| 3,999,516 A | 12/1976 | Shulick | |
| 4,043,739 A | 8/1977 | Appel | |
| 4,090,471 A | 5/1978 | Thompson | |
| 4,196,696 A | 4/1980 | Olander | |
| 4,303,038 A | 12/1981 | Thompson et al. | |
| 4,324,201 A | 4/1982 | Larson | |
| 4,441,454 A | 4/1984 | Happel et al. | |
| 4,459,938 A | 7/1984 | Noorlander | |
| 4,481,906 A | 11/1984 | Steingraber et al. | |
| 4,593,649 A * | 6/1986 | Britten | A01J 5/0133 119/14.08 |
| 4,604,969 A * | 8/1986 | Larson | A01J 5/08 119/14.36 |
| 4,745,881 A | 5/1988 | Larson | |
| 4,869,205 A | 9/1989 | Larson | |
| 4,907,535 A | 3/1990 | Matsuzawa et al. | |
| 5,007,378 A | 4/1991 | Larson | |
| 5,069,162 A | 12/1991 | Thompson et al. | |
| 5,482,004 A | 1/1996 | Chowdhury | |
| 5,493,995 A | 2/1996 | Chowdhury | |
| 5,572,947 A | 11/1996 | Larson et al. | |
| 6,009,834 A | 1/2000 | Krone et al. | |
| 6,039,001 A | 3/2000 | Sanford | |
| 6,055,931 A * | 5/2000 | Sanford, Jr. | A01J 5/044 119/14.47 |
| 6,142,098 A | 11/2000 | Van den Berg | |
| 6,276,297 B1 | 8/2001 | Van den Berg et al. | |
| 6,302,058 B1 | 10/2001 | Dahl et al. | |
| 6,439,157 B1 | 8/2002 | Petterson | |
| 6,598,560 B1 | 7/2003 | Van den Berg | |
| 6,755,153 B1 | 6/2004 | Chowdhury | |
| 6,796,272 B1 | 9/2004 | Chowdhury | |
| 6,895,892 B2 | 5/2005 | Sellner et al. | |
| 6,899,055 B2 | 5/2005 | Alveby et al. | |
| 7,290,497 B2 | 11/2007 | Rottier et al. | |
| 7,290,498 B2 * | 11/2007 | Shin | A01J 5/04 119/14.47 |
| 7,293,527 B2 * | 11/2007 | Shin | A01J 5/08 119/14.47 |
| 7,540,258 B2 | 6/2009 | Boast | |
| 7,841,365 B2 * | 11/2010 | Vetter | F16L 55/105 138/44 |
| 7,971,309 B2 * | 7/2011 | Houck | E03C 1/264 15/236.01 |
| 8,033,247 B2 | 10/2011 | Torgerson et al. | |
| 8,056,505 B2 * | 11/2011 | Laney | A01J 5/08 119/14.47 |
| 8,113,145 B2 | 2/2012 | Sellner | |
| 8,176,872 B2 * | 5/2012 | Crespo | A01J 5/08 119/14.44 |
| 8,356,576 B2 * | 1/2013 | Laney | A01J 5/08 119/14.47 |
| 8,485,129 B2 * | 7/2013 | Wulle | A01J 5/08 119/14.47 |
| 8,627,785 B2 | 1/2014 | Grace et al. | |
| 8,677,937 B2 | 3/2014 | Shin | |
| 9,138,938 B1 | 9/2015 | Joshi | |
| 9,204,616 B2 * | 12/2015 | Chowdhury | A01J 7/00 |
| 9,339,004 B2 | 5/2016 | La Torre et al. | |
| 9,526,225 B2 | 12/2016 | Kochman et al. | |
| 9,635,829 B2 | 5/2017 | La Torre et al. | |
| D830,649 S | 10/2018 | Hedlund | |
| 10,329,054 B1 * | 6/2019 | Haldiman | B65D 47/243 |
| 10,785,952 B2 * | 9/2020 | Hedlund | A01J 5/08 |
| 11,632,941 B2 | 4/2023 | Braun et al. | |
| 11,795,774 B2 * | 10/2023 | May-Ling | F16L 57/005 |
| 2004/0089242 A1 | 5/2004 | Verstege et al. | |
| 2004/0094096 A1 | 5/2004 | Fransen et al. | |
| 2005/0284378 A1 * | 12/2005 | Shin | A01J 5/08 119/14.47 |
| 2005/0284379 A1 | 12/2005 | Shin | |
| 2006/0005772 A1 | 1/2006 | Shin | |
| 2006/0016399 A1 | 1/2006 | Torgerson | |
| 2006/0207004 A1 * | 9/2006 | Lohnert | A47K 1/14 4/295 |
| 2007/0137582 A1 | 6/2007 | Boast | |
| 2007/0245965 A1 | 10/2007 | Petterson et al. | |
| 2007/0245966 A1 | 10/2007 | Pettersson et al. | |
| 2008/0035064 A1 | 2/2008 | Petterson et al. | |
| 2008/0252053 A1 | 10/2008 | Schneider et al. | |
| 2008/0276871 A1 | 11/2008 | Auburger et al. | |
| 2009/0007343 A1 * | 1/2009 | Houck | E03C 1/264 7/167 |
| 2009/0050061 A1 | 2/2009 | Duke | |
| 2009/0050062 A1 | 2/2009 | Auburger et al. | |
| 2009/0320760 A1 | 12/2009 | Torgerson et al. | |
| 2010/0083903 A1 | 4/2010 | Hiley et al. | |
| 2010/0275849 A1 | 11/2010 | Wulle et al. | |
| 2011/0132265 A1 | 6/2011 | Laney | |
| 2012/0055409 A1 * | 3/2012 | Laney | A01J 5/08 119/14.49 |
| 2014/0123903 A1 | 5/2014 | Priest | |
| 2014/0190416 A1 | 7/2014 | Kochman et al. | |
| 2016/0128299 A1 | 5/2016 | Hedlund | |
| 2016/0229604 A1 * | 8/2016 | Carsello | B65D 47/12 |
| 2017/0356268 A1 * | 12/2017 | Smith | E21B 33/128 |
| 2018/0098519 A1 * | 4/2018 | Rousseau | A01J 5/08 |
| 2022/0356979 A1 * | 11/2022 | Brao Amo | F16L 55/1141 |
| 2024/0077163 A1 * | 3/2024 | Desmarteau | F16L 55/1141 |

FOREIGN PATENT DOCUMENTS

| | | |
|---|---|---|
| WO | 99/66787 A1 | 12/1999 |
| WO | 00/69252 A1 | 11/2000 |
| WO | 02/07506 A1 | 1/2002 |
| WO | 2004/030445 A2 | 4/2004 |
| WO | 2008/031818 A1 | 3/2008 |
| WO | 2016/073861 A1 | 5/2016 |

OTHER PUBLICATIONS

International Search Report and Written Opinion mailed Jan. 20, 16; PCT Application No. PCT/US2015/059483, 12 pages.
International Preliminary Report on Patentability for PCT/US2015/059483 issued on May 9, 2017, 7 pages.
International Search Report mailed Feb. 4, 2004, PCT/US2003/031002, 4 pages.
Third-Party Submission Under 37 CFR 1.290 Filed on Oct. 31, 2017, U.S. Appl. No. 14/934,754, 20 pages.

* cited by examiner

SHORT MILK TUBE VENT PLUG FOR A DAIRY ANIMAL MILKER UNIT

FIELD AND BACKGROUND OF THE INVENTION

This invention relates generally to milker units for milking dairy animals, and more particularly to a milker unit short milk tube with an improved vent plug to maintain proper vacuum in the short milk tube with reduced interference to milk flow through the short milk tube.

Milker units for milking dairy animals include teat cup assemblies for attaching to a dairy animal's teats. In the case of cows, there are four teat cup assemblies that are each joined to a common milk collection claw and bowl assembly via a short milk tube. Each teat cup assembly includes a shell (teat cup) with a flexible liner. Each teat cup assembly is joined to the milk claw and collection bowl assembly via a short milk tube. These are the basic elements of a milker unit. The milker units are connected to long milk tubes through which milk flows to a central milk collection system for the dairy.

In the teat cup assembly, the liner fits inside the shell and a vacuum chamber is defined between the shell and the liner. A pulsating vacuum is applied to the vacuum chamber to move the liner in and out of compression (massaging) contact with a dairy animal teat that is in the liner. The pulsating vacuum in the pulsation chamber is opposed by a constant vacuum inside of the liner. The pulsating vacuum is applied through a pulsation connection in the side of the shell and the constant vacuum is applied through a milk hose connected to the liner. The milk hose vacuum also draws milk from the liner into the short milk tube, the milking claw and collection bowl, and through the long milk tube, and into the milk collection system. Vacuum systems have high energy costs and should be maintained and operated to be as efficient as possible.

The shell and liner are fitted together in a coaxial relationship and a mouthpiece of the liner fits over the top of the shell so that the mouthpiece, and not the shell, contacts the animal. The mouthpiece provides a vacuum seal against the teat of the animal being milked. The vacuum seal and the constant vacuum through the liner hold the teat cup assembly on the dairy animal and allow the constant vacuum to draw the milk down. The liner also includes a barrel joined to the mouthpiece and into which the animal's teat extends during milking. The teat is massaged by the liner barrel by the pulsating vacuum. Various barrel designs have been developed to improve cow comfort and milking efficiency, but other factors, such as vacuum levels affect animal comfort and even milking times.

The liner is adequately secured in the shell because the upper mouthpiece of the liner is engaged with an upper end of the shell, and a locking ring of the liner is engaged with a lower end of the shell. In a typical shell and liner assembly, the liner will even be somewhat tensioned in an axial direction because of the opposing engagements at the top and bottom of the shell.

Short milk tubes extending from the bottom of the liner often include vent holes to balance or limit the amount of vacuum applied to the shell liner for cow comfort and to improve milk flow through the short milk tube. Typically, the short milk tube vent hole is drilled or formed in the relatively soft short milk tube material. The softer material bends in use and can be plugged, so a vent plug of a relatively rigid or robust material is inserted in the vent hole to ensure reliable venting. The milking claw also typically has a vent hole, but liner milk tube vents offer the benefit of being closer to the teat end for improved and consistent milk flow, and to provide redundancy in case a vent does become clogged.

In the dairy environment, the plugs are exposed to liner twisting and impact forces that can damage or remove the plug, or tear the liner hole. Obviously, such damage limits the useful life of the short milk tube, which increases capital and maintenance costs.

The vent plug is relatively rigid and includes a vent passage that formed in a predetermined size to ensure adequate and predictable venting. The vent passage should be sized appropriately to avoid excessive vacuum on the animal teat and thereby ensure dairy animal comfort. Nonetheless, too much ventilation can cause foaming of the milk, turbulence in milk flowing through the short milk tube, and breakdown of fat globules in milk. Breaking up fat globules in milk can result in rancidity and reduces milk shelf life.

Importantly, excess venting through the vent passage wastes vacuum that must be generated by the central vacuum pump. Even small increases in vacuum requirements increase energy costs for operating vacuum pumps. Vacuum energy costs are a major cost in a dairy operation. Thus, venting a short milk tube can have benefits in cow comfort, but can also lead to wasted energy for vacuum pumps, cause foaming in the milk, and damage to milk fat.

As stated, turbulence in milk flowing through a short milk tube (and elsewhere in the milking equipment) should be kept to a minimum to avoid foaming and damage to fat globules in the milk. Excess foaming is unacceptable because it can enter and foul the vacuum system and affect milk pump efficiency downstream in the dairy system.

Foam in milk can also interfere with various types of sensors that monitor milk volume and quality. Effectiveness of sensors such as those using capacitance, induction, and light are all reduced by the presence of foam milk.

Sizing the vent passage is also not necessarily intuitive or easily derived. First, the vent plug must be molded to fairly tight tolerances, and a needle is typically used inside the plastic molding form to create the vent passage. The needle diameter used in some forming operations can be no smaller than about 0.6 mm in diameter to avoid a risk of breaking the form needle. Of course, increasing needle diameter could result in the vent passage being too large and cause excessive vacuum in the short milk tube.

Further, the length of the vent passage can have a dramatic effect on the amount of air that can pass through such a small vent passage. The length relative to the small diameter of the vent passage can restrict air flow if it is too long, for example.

The barbed end of the vent plug causes turbulence, but it is necessary because the vent plugs must be installed through the short milk tube vent hole, and they must remain securely in place without tearing the short milk tube. So, the vent plugs include a barbed end that is pushed through the vent hole causing the short milk tube to stretch out and then engage a vent plug shaft once the barbed end is through the vent hole. Of course, the vent plug is disposed into the milk flow path, so the vent plug actually causes problems, as described above.

Simply reducing the profile of the barbed end in a milk flow path can cause further problems because the length of the vent passage can have a dramatic impact on air flow through the vent passage, as explained above.

Another issue arises when vent plug passages are clogged by dirt and debris in the harsh dairy environment. Clogged plugs can be cleared, but they waste valuable operator time.

Liners are replaced on a regular basis, but the vent plug should not be causing premature failure of the liner.

Thus, there is needed a relatively inexpensive short milk tube and vent plug arrangement that provides adequate venting, is robust, resists clogging, and minimizes interference of milk flow.

SUMMARY OF THE INVENTION

The present invention is directed to a vent plug that reduces interference with milk flowing through a short milk tube while controlling the balance of vacuum in the short milk tube. The vent plug of the invention includes a barbed end and that minimizes its profile in the milk flow path and reduces turbulence of the milk as it flows over the barbed end. The reduced flow profile and improved flow characteristics of the barbed end reduces milk foaming and damage to the milk fat. The invention also maintains a controlled vent to the short milk tube to balance the need to vent the tube without wasting vacuum pump energy. In addition, milking efficiency can improve by maintaining proper vacuum level close to the animal teat end during milking. Milking efficiency in this context can include shorter milking times without increasing vacuum pump energy requirements.

A short milk tube in accordance with the present invention includes a short milk tube having a wall with an upstream end and a downstream end to define a milk passage bore extending between the upstream end and the downstream end. The wall also defines a vent plug mounting hole extending into the milk passage bore. A vent plug extends through the vent plug mounting hole, and the vent plug includes a cap, a shaft joined to the cap, a barbed end joined to the shaft, and defines a vent passage to at least partially vent the short milk tube bore. The barbed end defines at least one flow dimple that enables the barbed end to pass through the vent hole in the short milk tube, secure the vent plug in place, and result in improved milk flow past the barbed end.

The short milk tube can also include a vent plug seat lip extending outwardly above the short milk tube barrel wall to a first dimension and is at least partially surrounding the vent plug cap. The cap can include a debris barrier at least partially surrounding the vent passage and extending away from the cap to the first dimension. This arrangement limits collection of the debris between the lip and the cap, and provides a barrier against debris that could otherwise clog the vent passage. The outwardly extending vent cap debris barrier can also define a portion of the vent passage that can be used to improve air flow through the vent passage.

In some embodiments of the present invention, the flow dimple is an oval-shaped recess extending in a radial direction with rounded shoulders. A second flow dimple spaced apart from the flow dimple can also be included. The space in between flow dimples provides a smooth surface that slides on the short milk tube wall as the barbed end is pushed through the vent plug mounting hole during installation.

The shaft of the vent plug preferably includes a fillet adjacent to the cap to reduce wear on the short milk tube as the vent plug is installed and the short milk tube flexes, bends, and bears on the fillet and shaft during use.

The short milk tube wall can also include an interior vent seat in an inner wall surface, and the vent plug barbed end is at least partially disposed in the vent plug recess to further reduce milk flow interference. An exterior vent plug seat can be included, and can be recessed in an outer surface of the wall to at least partially receive the vent plug cap.

Also, in some embodiments, the vent passage includes a first portion with a first flow diameter and a second portion with a second flow diameter. The first portion is adjacent to a cap end and is relatively small to reduce the chance of debris entering the vent passage, while the second flow diameter extending toward the barbed end is relatively large, so that any debris that does enter the vent passage can pass through or at least not completely block the vent passage.

The short milk tube can also include a lip joined to and extending away from the wall, and at least partially surrounding the vent plug mounting hole, and with a lip overlay portion joined to the lip and extending at least partially over the vent cap. The cap can also define a debris dome extending outwardly from the cap to an extent that matches the outward extent of the lip, so that any debris that collects within the lip will not be as likely to plug the vent passage in the vent plug.

The invention is also directed to a vent plug, which can be used with a number of different short milk tube designs. In this embodiment, the invention is directed to a vent plug for a short milk tube wall having an upstream end and a downstream end, and the wall defines a vent plug mounting hole into the milk passage bore, and the vent plug includes: a cap, a shaft joined to the cap, and a barbed end joined to the shaft, and defines a vent passage to at least partially vent the milk passage bore and the barbed end defines a flow dimple at least partially disposed in the milk passage bore.

The vent plug can include a debris dome extending away from the shaft and through which the vent passage extends. The debris dome reduces the chance that debris can enter the vent passage.

Also, the flow dimple can be at least partially defined by rounded shoulders. Additional flow dimples can be included, and the barbed end can include a portion for being disposed in an inner vent plug seat in a short milk tube.

The short milk tube shaft can also include a fillet adjacent to the cap to better mate with the short milk tube vent hole and reduce stress concentrations that can damage the short milk tube wall.

The vent plug vent passage can include a first portion with a first flow diameter and a section portion with a second flow diameter and the first diameter is preferably smaller and that the second diameter to assist in keeping the vent passage open if debris enters the vent plug passage.

Further, features and advantages of the invention are described below and depicted herein.

DETAILED DESCRIPTION OF THE DRAWINGS

Figure 1:
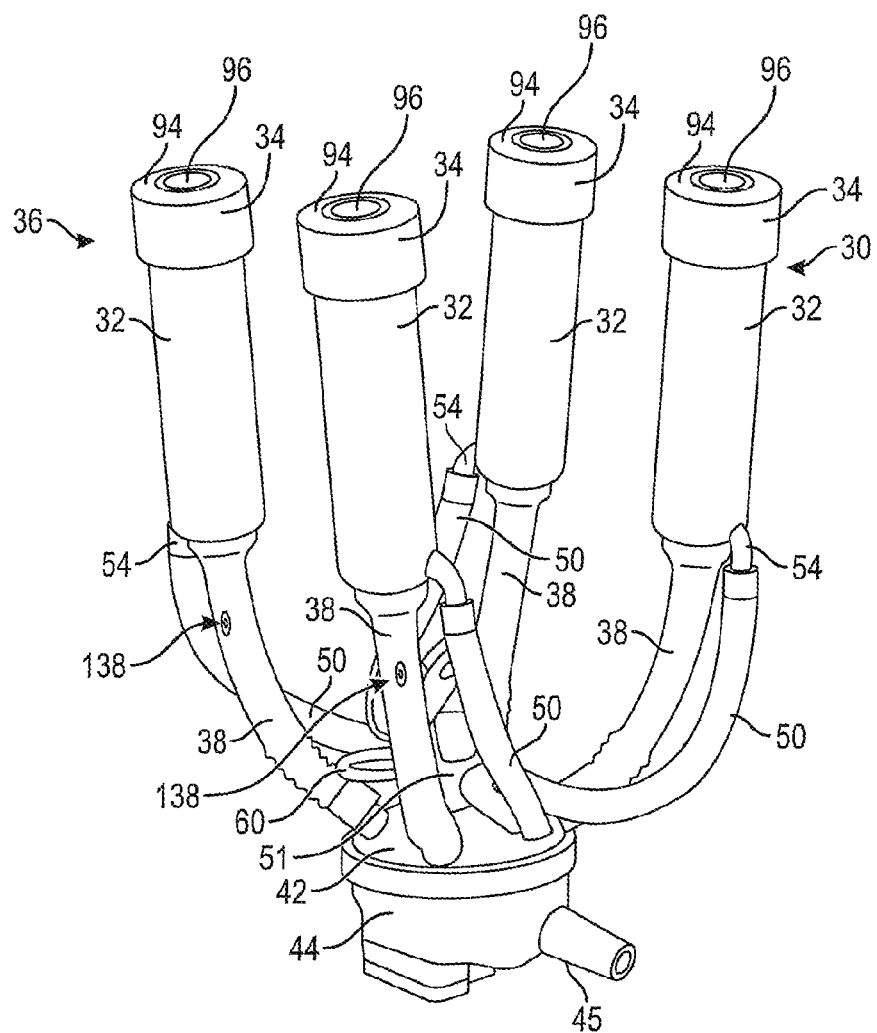
FIG. 1 is a perspective view of a milker unit with a vent plug arrangement in accordance with the present invention.

In the following detailed description of the drawings, the same reference numeral will be used to identify the same or similar elements in each of the figures.

For context, illustrated generally in FIG. 1 is a traditional milker unit 30 having (from upstream to downstream) a shell 32, a teat cup liner 34 disposed in the shell 32, a short milk tube 38 joined to or formed integrally with the teat cup liner 34, a milking claw 42, and a milk bowl 44 at its downstream end 118. There is one shell 32, liner 34, and short milk tube 38 (teat cup assembly 36) for each teat of the dairy animal. The milking claw 42 and milk bowl 44 collect milk from all of the short milk tubes 38. The objective of the milker unit 30 is to draw milk away from the dairy animal teats, out of a milk bowl outlet 45, and into the central dairy milk lines (not illustrated), reduce the amount of milk flowing back toward the teat, and reduce the amount of air drawn into the central dairy milk line when vacuum is being applied through the milker unit 30. All of these objectives must be done while ensuring dairy animal comfort. Once the milk reaches the central dairy lines, it is pumped through a chiller and into a storage tank. (Not illustrated.)

During milking, a dairy animal teat is inserted through an upper teat opening 96 of the teat cup liner 34. Just before and during milking, a constant vacuum is applied inside the milker unit 30 to attach the liner 34 and shell 32 to the teat and then draw milk through the liner 34, the short milk tube 38, the milking claw 42 and the bowl 44, and out of the milk bowl outlet 45. The weight of the milker unit 30 is supported by the teats because of the constant vacuum being applied inside the milker unit 30. Nonetheless, excessive vacuum in the milker unit 30 could cause dairy animal discomfort and even damage animal teats.

The shell 32 (sometimes referred to in the art as a "teat cup") is a relatively rigid cup typically made of stainless steel or other suitable material. The teat cup liner 34 is disposed inside the shell 32, and a pulsation chamber is defined in the space between the shell 32 and the liner 34. A distribution manifold for vacuum is mounted on the milking claw 42 connects a vacuum supply from a long pulsation hose to the short pulsation hoses 50 connected to each teat shell (cup) 32. The pulsation acting on the pulsation chamber moves the liner 34 in and out of contact with the animal teat to milk the animal. A hanger 60 is also provided on the milking claw 42 to support the milker unit 30 from a milker unit detacher mechanism (not illustrated) when not milking.

Figure 2:
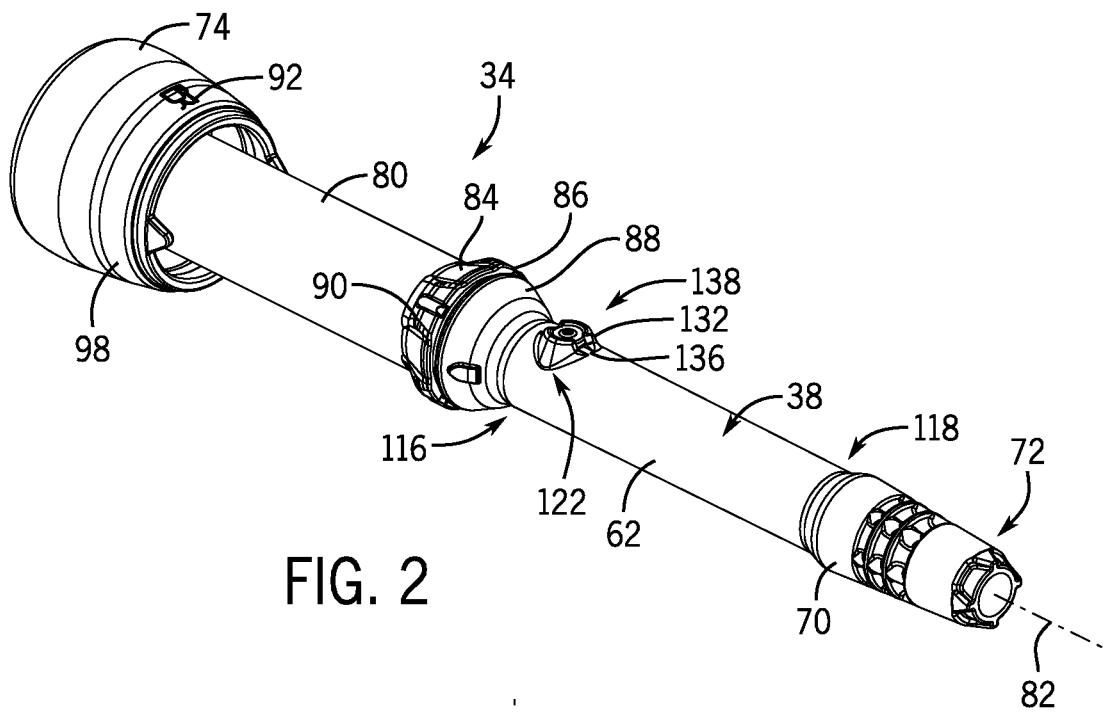
FIG. 2 is a perspective view of a teat cup assembly shell liner having a vent plug arrangement in accordance with the present invention.
Figure 8:
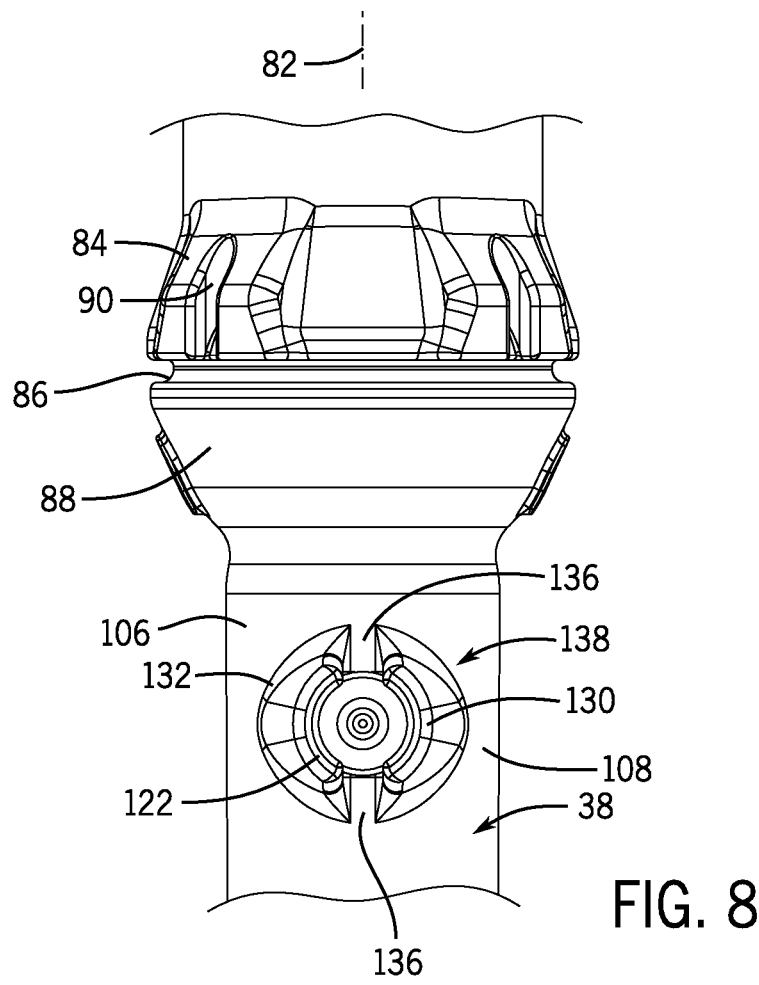
FIG. 8 is a front view of a vent plug arrangement in accordance with the present invention.

Depicted in FIG. 2 is a perspective view of a shell liner 34 (sometimes referred to herein as simply a "liner"). The shell liner 34 includes a mouthpiece 74 defining a teat opening 96, (FIG. 1) a liner barrel 80 joined to the mouthpiece 74 and extending downwardly as depicted, an upper locking ring 84, and a lower locking ring 88 spaced apart from the upper locking ring 84 to define a shell-engaging annular recess 86 and a lower locking ring 88. The upper locking ring 84 defines a number of alignment recesses 90, as seen in FIG. 2.

The liner 34 can also include an integral short milk tube 38 joined to the barrel 80 and having a teat claw connecting end 70. The short milk tube 38 is an optional extension of the liner 34, and in other embodiments, the short milk tube 38 can be a separate item that extends between the liner 34 to the milk collecting bowl 44.

As depicted in FIGS. 1 and 2 for example, the liner 34 mouthpiece 74 can be of a type and shape described and depicted in U.S. Pat. No. 8,113,145, which is incorporated herein by reference, but other mouthpiece shapes and sizes can be used with the present invention. As depicted in FIGS. 1 and 2, the mouthpiece 74 generally includes an upper surface 94 that interfaces with a teat and udder of a dairy animal to form a comfortable seal that minimizes loss of vacuum from the inside of the liner 34 through the teat opening 96, so that the liner 34 and other components do not prematurely detach during milking.

The mouthpiece 74 further includes a downwardly extending skirt 98 that extends downward and is spaced apart from the liner barrel 80 so that an upper end of the shell 32 (described below) can fit between the liner barrel 80 and the mouthpiece skirt 98, (see FIG. 2) when assembled. The mouthpiece skirt 98 can also include an alignment mark to aid in assembly.

Preferably, and as illustrated, the teat claw connecting end 70 includes an end connector 72 of the type described and depicted in U.S. patent application Ser. No. 16/946,646, which is incorporated herein by reference, but other types of short milk tube connector ends can be used with the present invention.

The liner barrel 80 defines a longitudinal axis 82 (FIGS. 2 and 3) and the liner barrel 80, itself, can have any desired cross-sectional shape including, round, oval, triangular, square, and the shape illustrated in the figures, for example. Typically, the liner barrel 80 shape is selected to optimize animal comfort and milking efficiency. The liner barrel 80 (the portion inside the shell 32) illustrated herein can have walls and corners (see FIG. 1, for example) that can be of uniform thickness or have varied thicknesses to control collapse of the barrel wall during pulsation and milking for dairy animal comfort or for simplifying manufacturing. Any desired barrel cross-sectional shape can be used with the present invention.

The liner barrel 80, and particularly the upper locking ring 84 of the liner 34, preferably defines two pairs of alignment recesses 90 (FIG. 2) to be engaged by the shell keys (not illustrated) formed in the shell 32. Although it is preferred to include the upper locking ring 84, it is not necessary, and the alignment recesses 90 can be formed in any part of the liner barrel 80, but preferably in the lower end of the liner barrel 80.

Once the liner 34 is installed, it is preferably tensioned somewhat along the longitudinal axis 82, due to the relative size of the shell 32 and the liner barrel 80. This is sometimes referred to as "pretensioning" and it improves liner performance. A second alignment feature can be formed in the lower locking ring 88 or elsewhere to avoid twisting the liner barrel 80 during installation.

As seen in FIGS. 5 through 18, for example, the short milk tube 38 of the present invention includes a short milk tube wall 106, having an exterior surface 108, an interior surface 110, and a milk passage bore 112 between an upstream end 116 of the short milk tube 106, and a downstream end 118 of the milk tube 106. As stated above, the short milk tube 38 is vented closely to the teat end to maintain a near constant vacuum close to the teat end for efficient milking. The degree to which the short milk tube 38 is vented preferably achieves a constant vacuum for animal comfort and steady milk flow through the short milk tube 34, and avoids excess ventilation that wastes vacuum pump energy and efficiency.

The air vent plug mounting hole 120 (FIGS. 4 and 5) extends through a short milk tube wall 106 to control and limit the amount of vacuum applied to the portion of the liner 34 inside the shell 32 (the barrel 80), and the animal teat, and to improve milk flow through the short milk tube 38.

Figure 3:
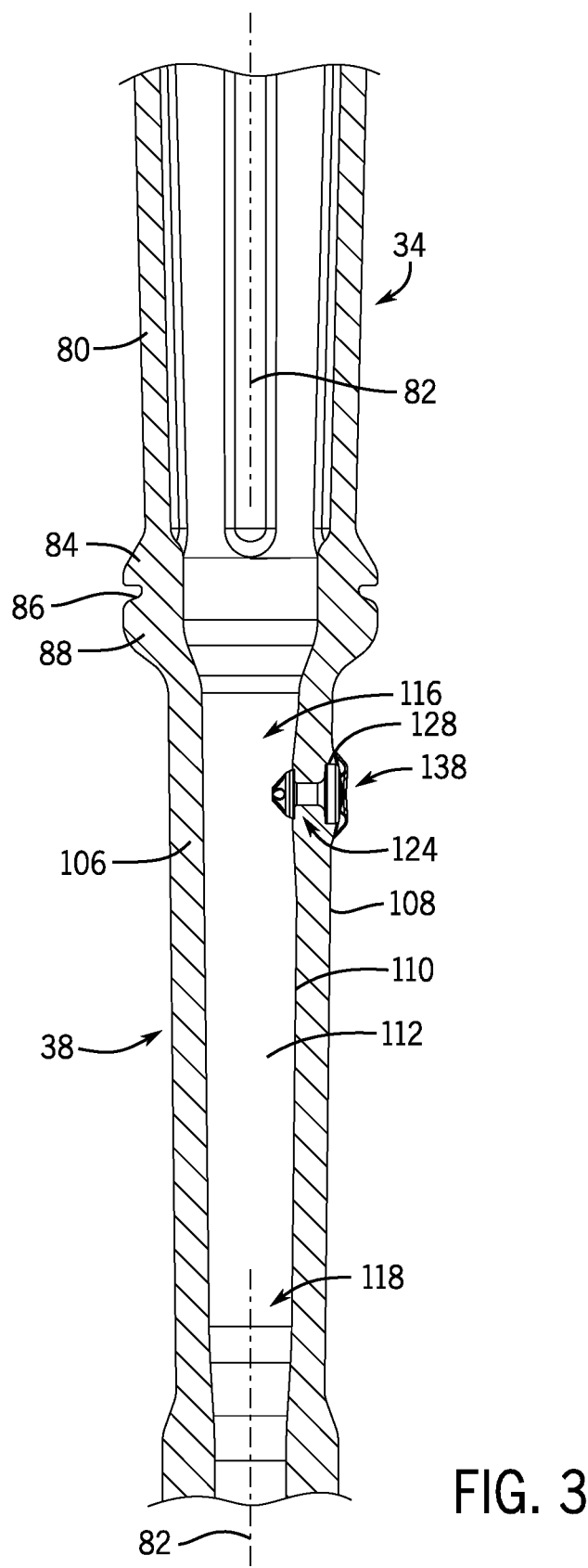
FIG. 3 is a side cross-sectional view of the shell liner with the vent plug arrangement of the present invention.
Figure 4:
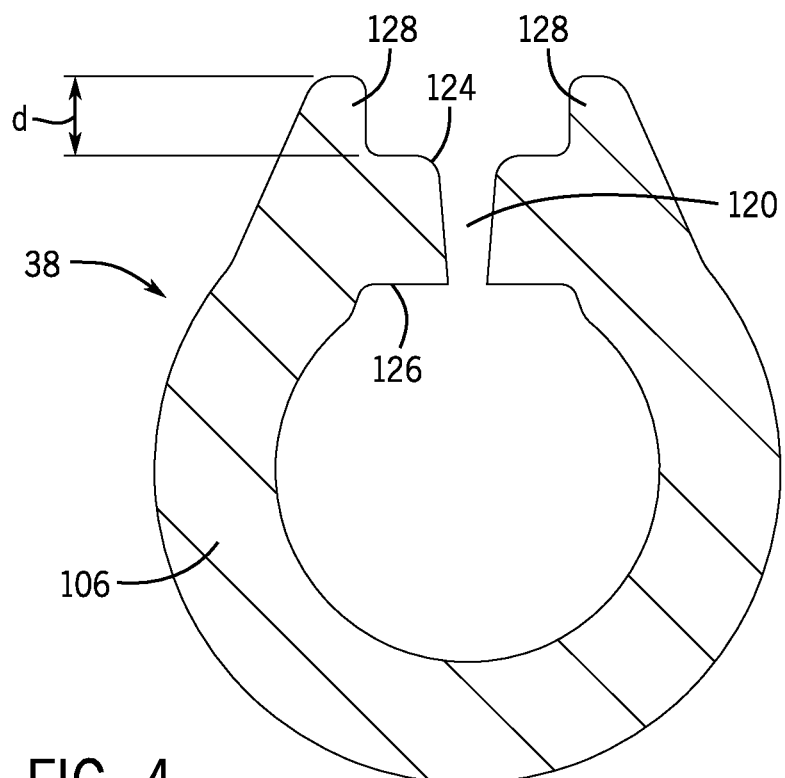
FIG. 4 is a cross-sectional view of a short milk tube with an air vent plug mounting hole.

FIGS. 3 and 4 illustrate examples of the short milk tube 38 with an air vent plug assembly 138 in which the air vent plug mounting hole 120 is surrounded, at least partially, by an air vent plug seat 122 in accordance with the present invention. The air vent plug seat 122 preferably includes an exterior vent plug seat 124, an interior vent plug seat 126, and a lip 128 extending outwardly a distance "d" (FIGS. 4 and 5) from the short milk tube 38. The lip 128 can also include a lip overlay 130 (FIGS. 11 and 12), and a stiffener 132 to control localized bending in the short milk tube 38 and distortion of the vent plug seat 122. The use of a lip overlay 128 can be beneficial in maintaining the vent plug 140 in position. Nonetheless, the type of material used to mold the short milk tube 38 can determine whether such a lip overlay 128 can be formed easily. For example, in silicone liners, a lip overlay can be formed, but when the block rubber is used, a lip overlay is not used.

Figure 11:
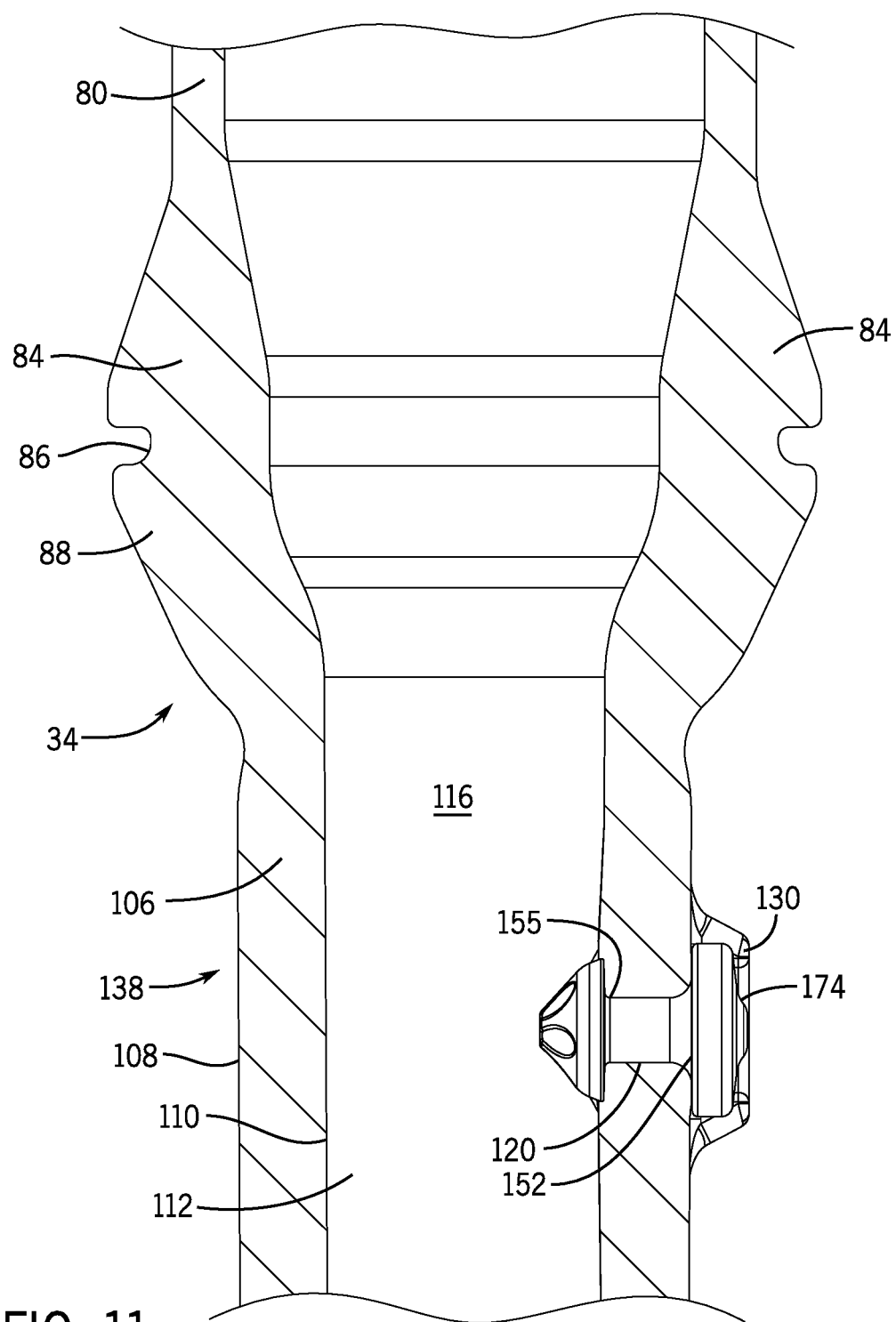
FIG. 11 is a cross-sectional side view of the short milk tube with the vent plug arrangement.
Figure 12:
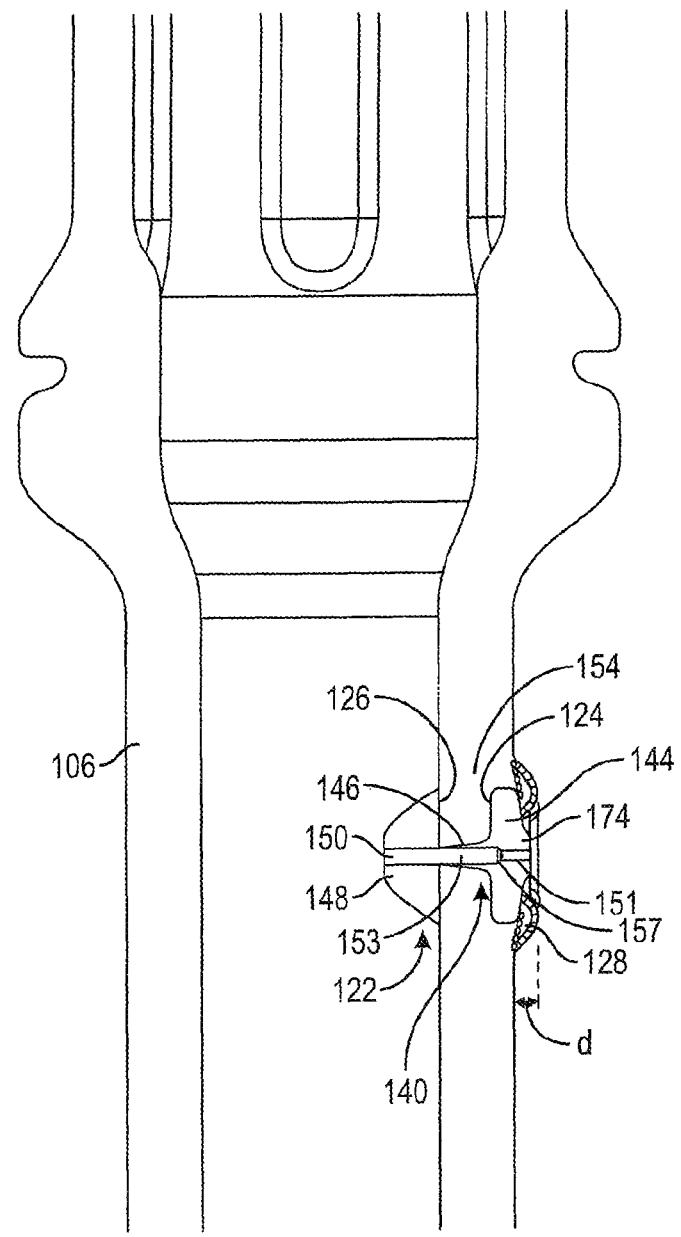
FIG. 12 is a cross-sectional side view of the short milk tube and vent plug.
Figure 13:
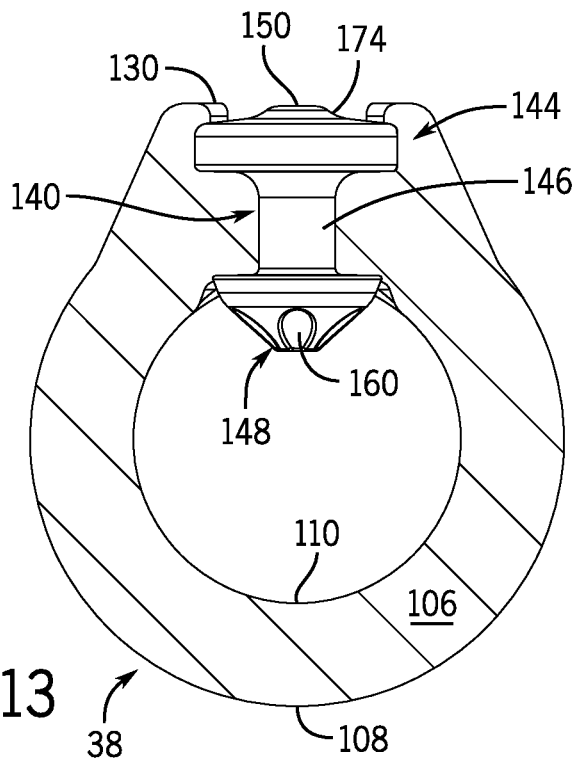
FIG. 13 is a cross-sectional end view of the liner with short milk tube vent plug arrangement.

In preferred embodiments, the lip 128 and stiffeners 132 include drain gaps 136 (FIGS. 6 and 7, for example) for draining fluids and solid debris that might otherwise accumulate in the space inside the lip 128 and around an air vent plug 140. The air vent plug assembly 138 includes at least the vent plug seat 122, the air vent plug mounting hole 120, and the air vent plug 140, as seen in FIGS. 11 and 12, where no stiffener is present.

Figure 5:
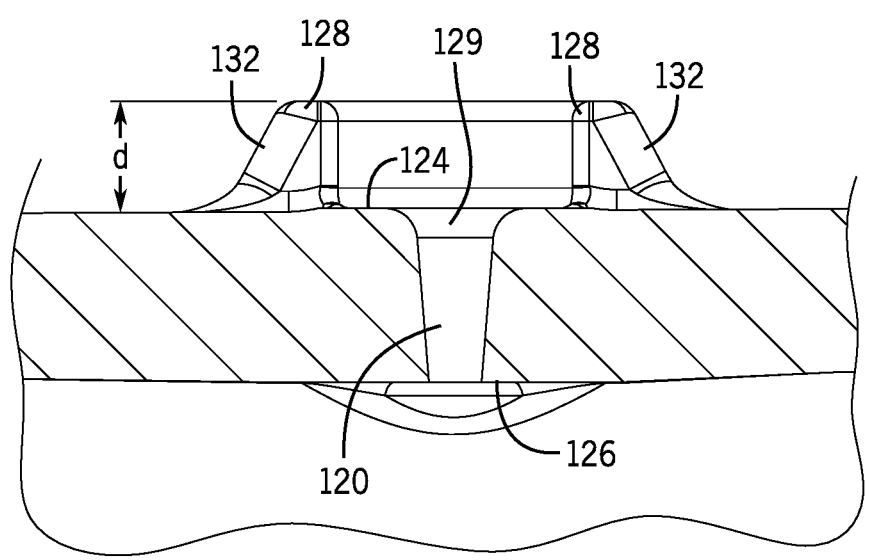
FIG. 5 is a cross-sectional view of a short milk tube with an air vent plug mounting hole with a lip and vent stiffener.

In the present invention, the air vent plug mounting hole 120 is preferably formed simultaneously with the formation of the short milk tube 38 in a tapered shape, as seen in FIGS. 4 and 5 for example, or drilled after forming. A tapered or rounded portion 129 can be included to facilitate molding and assembly. The air vent plug mounting hole 120 is preferably located at an area of increased short milk tube wall thickness 154. (See FIG. 12, for example) Other methods for forming the air vent plug mounting hole are also possible.

As seen in FIGS. 11, 12, 13, 14, 20, and 21, the air vent plug mounting hole 120 is preferable mated with the air vent plug 140 in size to enable the vent plug 140 to be inserted without tearing the wall 106, and still provides a substantially fluid tight seal against the air vent plug 140.

The air vent plug 140 includes a cap 144, a shaft 146, and a barbed end 148 through which a defined vent passage 150 is formed. The air vent plug 140 is used to ensure that the vent passage 150 remains open and is of a predetermined size. The air vent plug 140 is made of a relatively rigid or robust material (such as Grilamid TR90, for example), as compared to the more flexible material used for the short milk tube 38, to ensure that the vent passage 150 remains open and is a consistent vent opening size. Preferably, the vent plug shaft 146 is sized to substantially match the thickness of the short milk tube wall 106, or is slightly shorter than the wall 106 thickness to ensure a snug fit. Additionally, to reduce stress concentrations on the short milk tube wall 106 at the air vent plug mounting hole 120, a cap fillet 152, and a barbed end fillet 155 are formed in the shaft 146, as illustrated.

Figure 18:
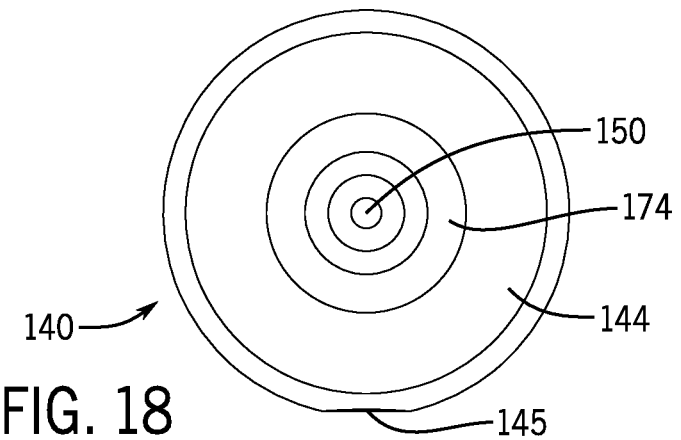
FIG. 18 is a top view of the vent plug of FIG. 15.
Figure 17:
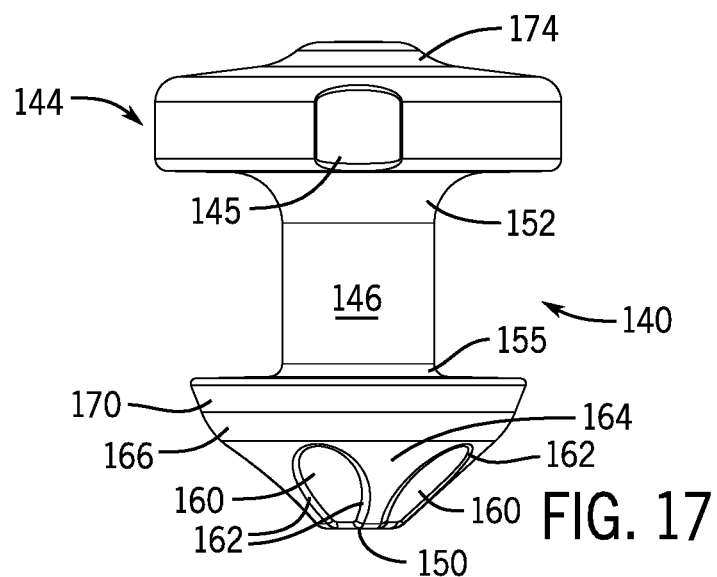
FIG. 17 is a side view of the vent plug of FIG. 15.
Figure 19:
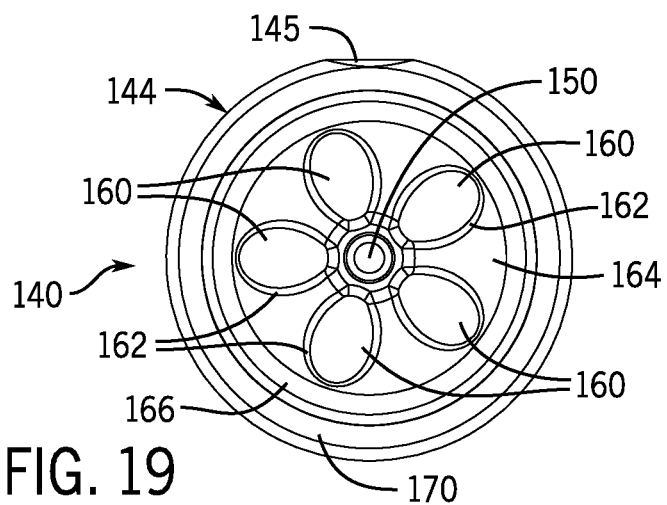
FIG. 19 is a bottom view of the vent plug of FIG. 15.

The air vent plug cap 144, as illustrated, includes a notch 145 that results from the forming process, as illustrated in FIGS. 17 to 19, but the notch 145 is not necessary for the invention.

To further ensure a good mating surface between the short milk tube 38 and the air vent plug 140, the air plug vent seat 122 preferably includes the exterior vent plug seat 124 shaped and sized to mate with the underside of the vent plug cap 144. For example, the exterior vent plug seat 124 can be a recess with a flat bottom to match the underside of the vent plug cap 144, (FIG. 11, for example) as opposed to an arcuate surface of the short milk tube wall 106 mating with a flat plug surface on the underside of the vent plug cap 144, or any other desired part of the air vent plug 140.

Figure 10:
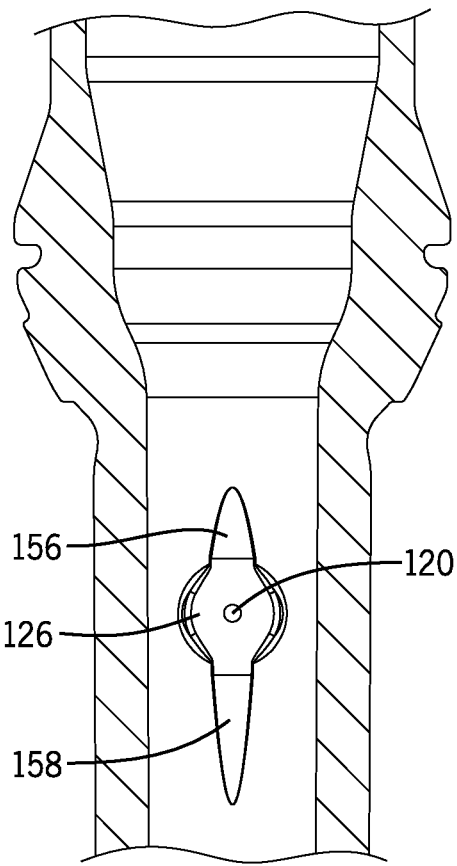
FIG. 10 is a front view of the interior vent plug seat of FIG. 9.
Figure 9:
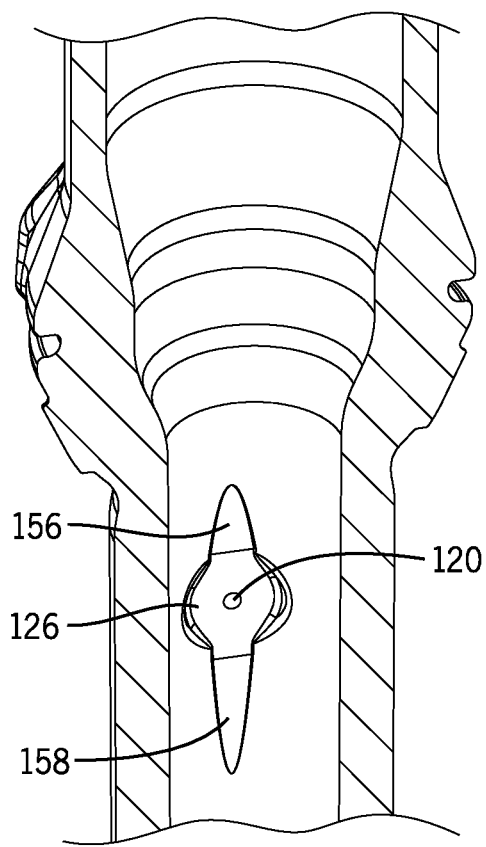
FIG. 9 is an upper perspective view of an interior vent plug seat in accordance with the present invention.

Also preferably, and as seen in FIGS. 11 and 12, the interior vent plug seat 126 is shaped and sized to mate with the barbed end 148 on the air vent plug 140, and to provide a reliable bearing surface on which the barbed end 148 can bear and provide reliable connection with the air vent plug 140. Preferably, the interior vent plug seat 126 is also flat (FIGS. 11 and 12) to mate with the barbed end 148, and as seen in FIGS. 9 and 10, it can include an upstream recessed flow transition channel 156 upstream from the air vent plug 140 or a downstream recessed flow transition channel 158 or both to form a smoother flow transition toward and away from the barbed end 148.

The portion of the short milk tube wall 106 in which the air vent plug seat 122 is formed can be thicker 154 than other portions of the short milk tube wall 106 for strength and to provide material in which to form the upstream recessed flow transition channel 156 and the downstream recessed flow transition channel 158, and to reduce bending in the area of the air vent plug assembly 138. (See FIGS. 12, 20, and 21, for example.) A thicker short milk tube wall 106 can also resist tearing of the material when the barbed end 148 is pushed through the air vent plug mounting hole 120 during installation. The air vent plug 140 is typically not removed once it is installed.

As seen in FIGS. 11, 12, 20, and 21, the vent plug barbed end 148 extends into the short milk tube 38 milk passage bore 112. Any obstacle in the milk passage bore 112 can interfere with milk flow by slowing the flow, causing turbulence, and creating a surface for milk residue and backwashing fluids to collect. Nonetheless, the barbed end 148 is necessary to secure the air vent plug 140 to the short milk tube barrel wall 106. Without it, the air vent plug 140 can be dislodged and the vent plug mounting hole 120 may not be sufficient by itself to maintain proper vacuum levels in the short milk tube 38.

Figure 20:
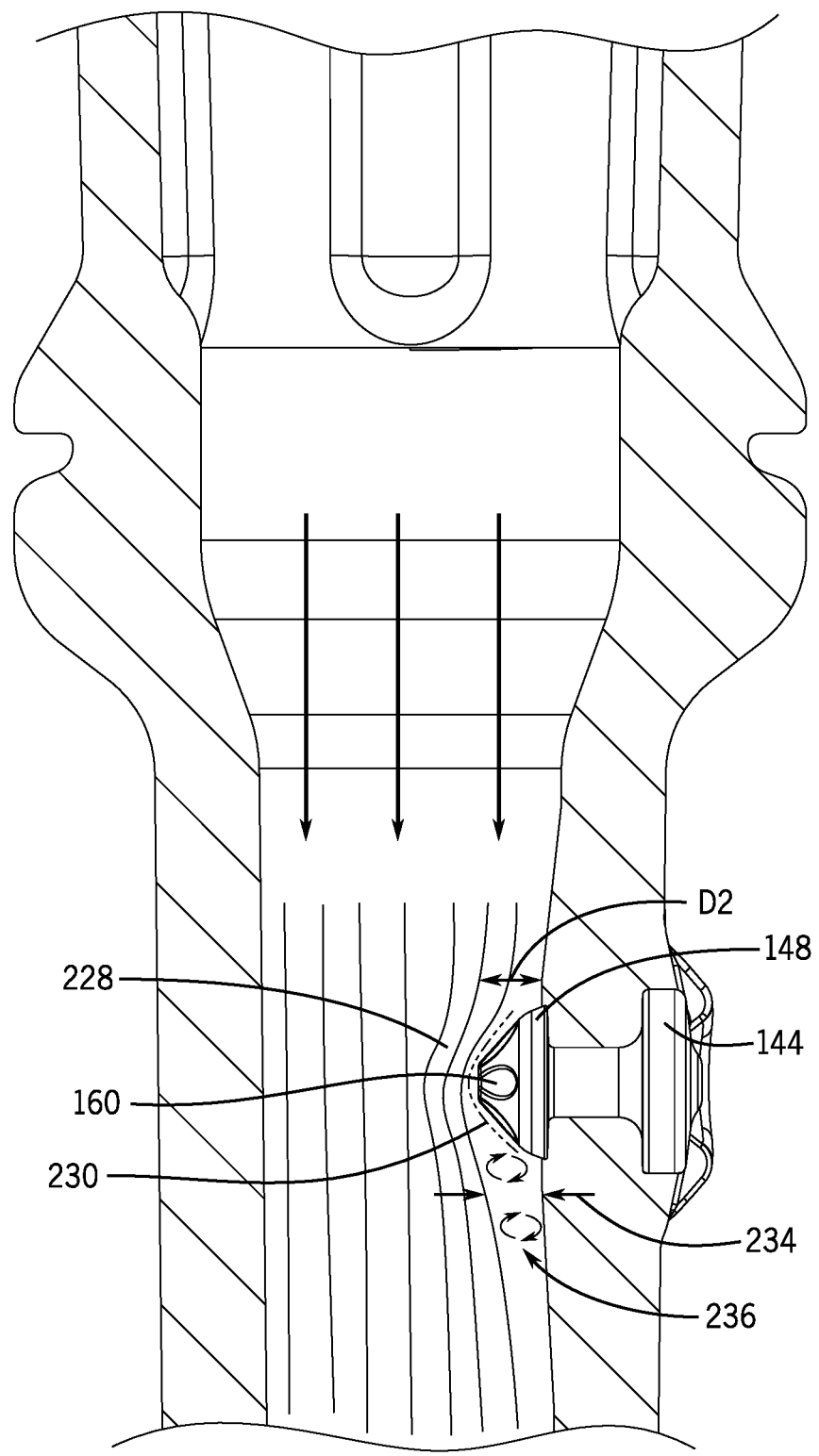
FIG. 20 is a side cross-sectional view of the short milk tube with an air vent plug and milk flow lines.

To reduce interference of the milk flow, the present invention includes a barbed end 148 with at least one, but preferably, a number of flow dimples 160 formed in a surface over which milk flows. (FIGS. 15 to 19.) The flow dimples 160 reduce the contact surface that milk is exposed to as it flows by, and therefore, improves milk flow and also reduces turbulence in the milk, as depicted in FIG. 20. The flow dimples 160 are formed on the barbed end 148 at a position to be exposed to milk flow through the milk passage bore 112.

In the illustrated embodiment, the flow dimples 160 are spaced-apart, and are oval-shaped with rounded shoulders 162 with sliding surfaces 164 in between the flow dimples 160. The flow dimples 160 are preferably uniformly spaced apart, but the number, shape, and spacing of the flow dimples 160 can be modified and still be within the scope of the present invention. The flow dimples 160 preferably extend along the barbed end 148 between the vent passage 150 and an angular surface 166 that serves as a transition region between the flow dimples 160 and a recess ring 170 that is preferably disposed in a recessed interior vent plug seat 126 of the short milk tube wall 106. The recess ring 170 can fit snuggly in the recessed interior vent plug seat 126 or, preferably, there is space around the recess ring 170 so that the rinsing fluids could reach the recess ring 170 for improved sanitation. This shape helps prevent milk collecting in the interior vent plug seat 126 and next to the air vent plug 140.

In addition, the barbed end 148 must be shaped to be pressed through the air vent plug mounting hole 120 without tearing the short milk tube 106. Thus, the barbed end 148 must not stretch the short milk tube hole 120 beyond a yield point for the material, but it must be large enough to hold the air vent plug 140 in place. The sliding surfaces 164 between the flow dimples 160 assist in this process by providing a uniform and smooth surface to stretch the air vent plug mounting hole 120 without stress concentrations or high friction. Further, the barbed end 148 is preferably shaped to provide a low profile and not extend into the short milk tube wall 106 and interfere with milk flow. Thus, the shape for insertion and the holding force necessary to maintain the air vent plug 140 in place, is as illustrated.

The flow dimples 160 are enough by themselves to improve flow characteristics for milk flowing past the barbed end 148. Nonetheless, the rounded shoulders 162, the angular surface 166, the use of a recess ring 170 disposed in the interior vent plug seat 126, and the transition channels 156 and 158, each and in combination with each other, and the flow dimples 160 improve milk flow characteristics through the short milk tube 34.

To further enhance flow characteristics, the barbed end can be formed in a lower profile shape, but this translates into a reduced vent passage length which can affect the degree to which the short milk tube 34 is vented.

Figure 21:
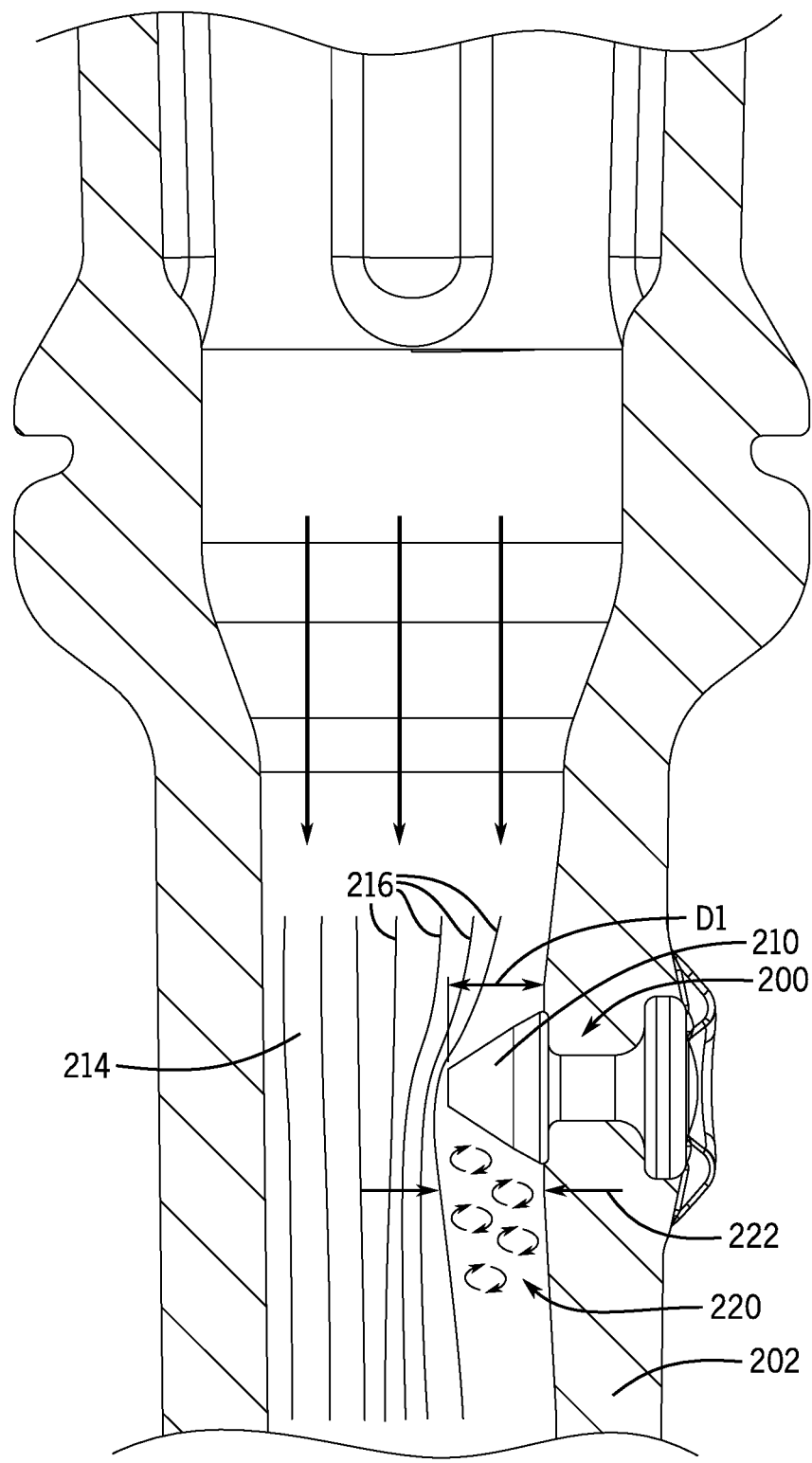
FIG. 21 is a side cross-sectional view of a prior art short milk tube vent plug and illustrating milk flow lines.

FIGS. 20 and 21 illustrate the differences in milk flow between the prior art (FIG. 21) and the present invention (FIG. 20). In the prior art, an air vent plug 200 is disposed in a short milk tube wall 202. The barbed end 210 extends into a milk flow path 214 a distance D1, disrupts the flow, as seen in the flow lines 216, and causes turbulence 220 in a thick wake 222 downstream from the barbed end 210.

The present invention (FIG. 20), has the barbed end 148 described above, which extends only a distance D2 into the milk flow path to create flow path 228. The flow dimples 160 create a turbulence boundary layer 230 over the barbed end 148, and only a thin wake 234 with reduced turbulence 236 is created. This results in increased laminar flow, and promotion of higher flow rates and higher quality milk, as explained above.

Figure 14:
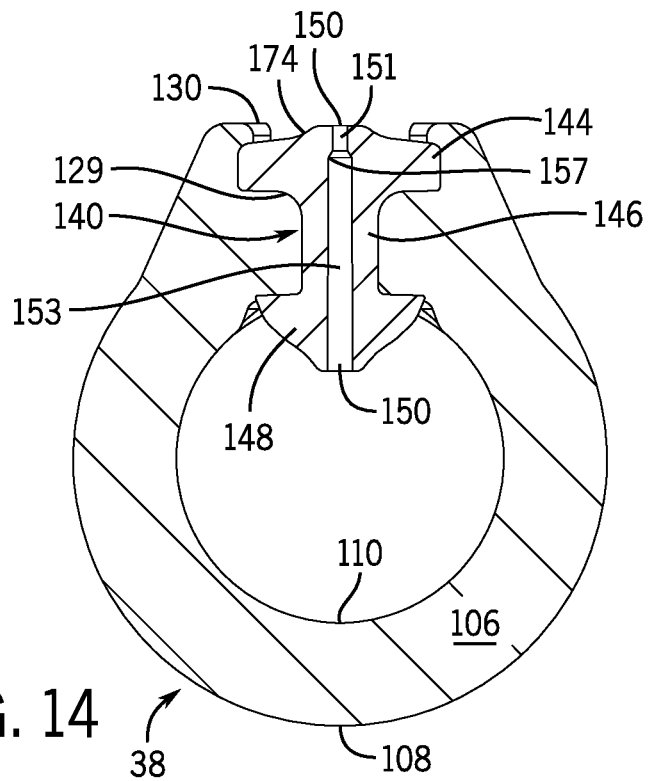
FIG. 14 is a cross-sectional view of the liner and vent plug arrangement of FIG. 13.
Figure 15:
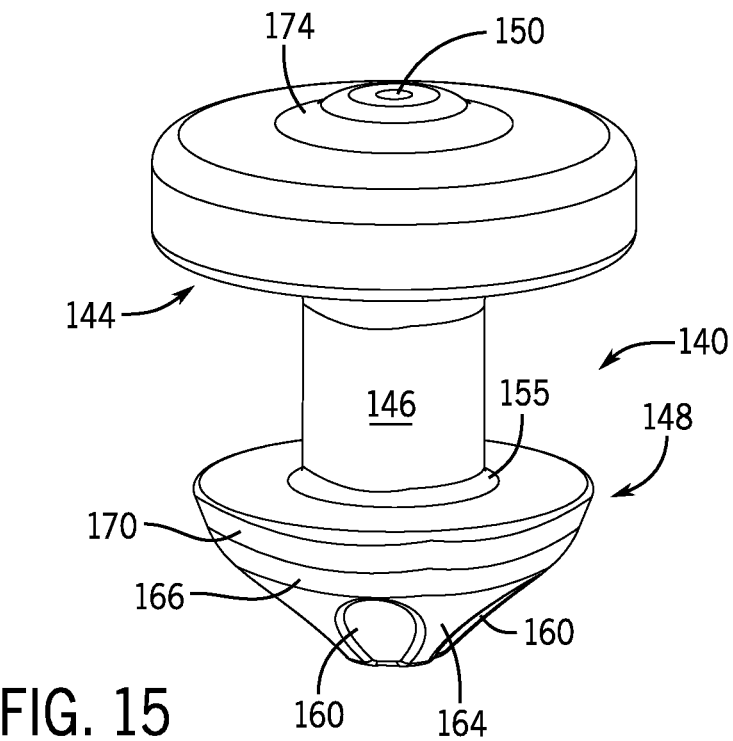
FIG. 15 is an upper perspective view of a vent plug in accordance with the present invention.
Figure 16:
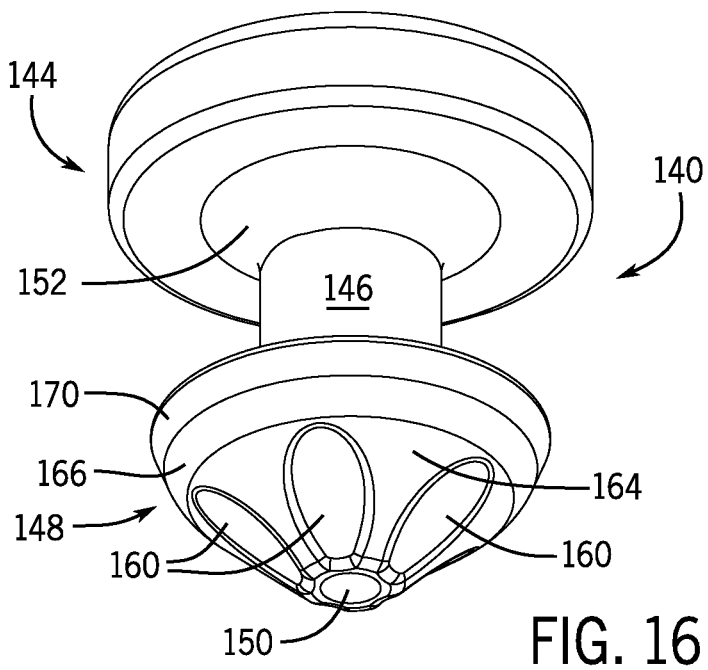
FIG. 16 is a lower perspective view of the vent plug of FIG. 15.

Referring to FIGS. 12 and 14, the air vent passage 150 preferably includes a first portion 151 adjacent to the cap 144 and a second portion 153 adjacent to the barbed end 148. A tapered transition portion 157 is preferably used to ease the flow transition between the first portion 151 and the second portion 153. Preferably, the transition portion 157 is tapered at about 60°, but other angles are possible. In the illustrated embodiment, the first portion 151 has a relatively small diameter and the second portion has a relatively large diameter, but it is possible to reverse this arrangement or to have both portions the same diameter.

Air flow amounts and rates are dependent on the length and diameter of the air vent passage 150, and in particular, the first portion 151. For example, a preferred air vent passage 150 is about 9.6 mm long from the top of the cap 144 to the bottom of the barbed end 148. The primary air flow controlling portion is the first portion 151, and it is preferably about 0.6 mm in diameter and between about 0.99 mm and about 2.5 mm long, and more preferably between about 1.6 mm and about 2.5 mm long. The second portion 153 is preferably about 0.9 mm in diameter and accounts for the remaining length of the air vent passage 150 length. Further, the second portion 153 is preferably tapered outward slightly as it extends through the barbed end 148 to facilitate molding and the other air flow and anti-clog features described herein. In one embodiment, the taper is about 0.9 mm to about 1.00 mm at the open end.

The term "about" is used herein to allow for variances in molding operations and material properties. For example, a diameter of 0.60 mm could vary by plus or minus 0.1 mm.

The first portion 151 can limit the size and amount of debris that can enter the air vent passage 150, and the second portion 153 can provide an ample air passage even when some debris enters the second portion 153. Further, the small debris entering the first portion 151 will more easily pass through the larger second portion 153, so that it is less likely the air vent passage 150 will be clogged.

As stated above, the exterior vent seat 124 can also include a lip 128 that extends outwardly a distance d (FIGS. 11 and 12) from the short milk tube barrel wall 106. Preferably, the lip 128 is spaced slightly apart from the vent plug mounting hole 120, so that the cap 144 of the air vent plug 140 is in contact with the lip 128 when the air vent plug 140 is inserted in the vent plug mounting hole 120. The lip 128 protects the air vent plug 140 from impact forces and helps retain the air vent plug 140 if the short milk tube is twisted.

Preferably, the lip 128 can also include an overlay portion 130 (FIGS. 11 and 12) that extends over the cap 144 and enhances protection and retention of the air vent plug 140. An adverse effect of this arrangement is that dirt and debris that can lodge around the air vent plug 140. The cross section of the lip 128 and lip overlay portion 130 preferably matches the shape of the air vent plug 140, as seen in FIGS. 11 and 12.

A debris dome 174 is preferably added to the cap 144 to extend outwardly from the cap 144 so that the total dimension of the cap 144 and debris dome 174 is substantially the same as the distance d, which is the distance the lip 128 extends from the short milk tube wall 106. The debris dome 174 therefore minimizes the chance for dirt and debris to lodge around the vent plug mounting hole 120 and air vent plug 140. The debris dome 174 can extend outwardly more or less than the distance d and still serve this function.

Figure 7:
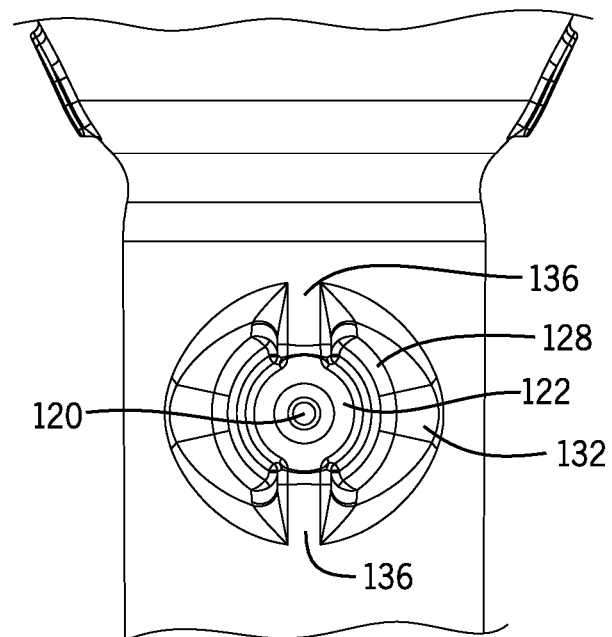
FIG. 7 is a front view of the exterior vent plug seat of FIG. 6.
Figure 6:
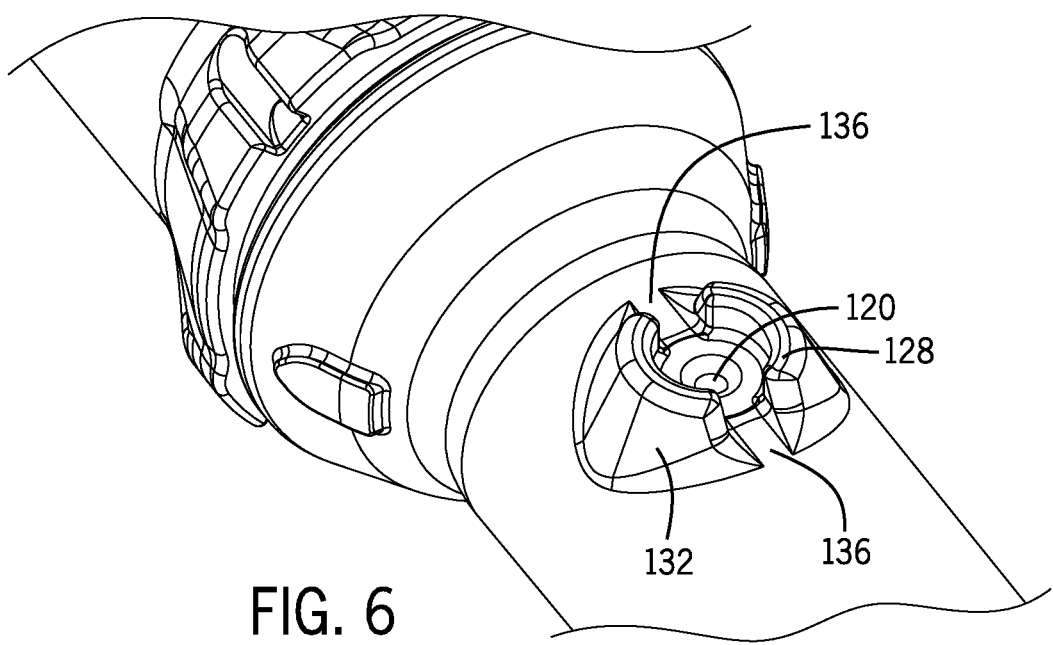
FIG. 6 is a perspective view of an exterior vent plug seat for receiving the vent plug of the present invention.

As seen in FIGS. 6 and 7, the illustrated air vent seat 122 includes an optional stiffener 132 extending away from the air vent seat 122 to at least partially control the degree and direction of localized flexing of the short milk tube wall 106 during installation and use. Preferably, the stiffener 132 extends away from the air vent seat 122 in at least one direction. The stiffener 132, as illustrated, extends away in a lateral direction at a greater amount than in a longitudinal direction to provide some flexibility of the lip 128 in a longitudinal direction while resisting more lateral flexing. Resisting lateral flexing improves protection for the air vent plug seat 122 and air vent plug 140. A greater degree of flexing in the longitudinal direction permits greater longitudinal flexing of the short milk tube 38 during use and installation and to allow dirt and debris to drain from inside around the air vent plug mounting hole 120.

The debris dome 174 also proved an extension to the vent passage 150 that can offset the loss of the vet passage length that results when the barned end 148 is used with a reduced profile (shorter) in the milk flow path.

The stiffener 132 can extend above the surface of the short milk tube 38, either on an internal surface or an external surface, as illustrated. The stiffener 132 can also be flush with the surface of the short milk tube 38 and be made of different and more rigid material than is used in the short milk tube 38).

The stiffener 132 can be any desired shape to compliment the shape of the vent or the vent plug or accommodate forces that are expected to act on the short milk tube 38 and control bending as desired. There may even be multiple parts or rows of lips or there may be lips of different heights to protect the vent plug mounting hole 120 and air vent plug 140 from impact from different directions. The stiffener 132 can even aid in resisting twisting of the short milk tube 38 around the longitudinal axis 82 of the short milk tube 38.

Although depicted as being positioned close to the vent, the lip 128 can be spaced apart from the air vent plug mounting hole 120 to allow an operator to grab the vent plug cap 144 for removal, if necessary.

Preferably, the liner 34 is made of silicone, and the air vent plug 140 is made of Grilamid TR90, but any other suitable liner material, and preferably approved by the Food and Drug Administration, can be used.

The foregoing detailed description of the drawings is provided for a better understanding of the present invention. Nothing therein is intended to unduly limit the scope of the following claims and no unnecessary limitations should be read into the following claims.

The invention claimed is:

1. A short milk tube comprising:
   a wall with an upstream end and a downstream end and defining a milk passage bore extending between the upstream end and the downstream end, and the wall defines a vent plug mounting hole;
   a vent plug extending through the vent plug mounting hole and including a cap, a shaft joined to the cap, and a barbed end joined to the shaft, and defining a vent passage to at least partially vent the milk passage bore; and
   a flow dimple defined in the barbed end and disposed adjacent to the vent passage in the milk passage bore, the flow dimple providing no fluid conduction path between the barbed end and the cap, wherein the flow dimple is an oval-shaped recess with rounded shoulders.

2. The short milk tube of claim 1, wherein the barbed end further defines a second flow dimple spaced apart from the flow dimple and disposed in the milk passage bore.

3. The short milk tube of claim 1, wherein the barbed end further defines a plurality of additional flow dimples disposed in the milk passage bore.

4. The short milk tube of claim 1, wherein the shaft includes a fillet adjacent to the cap.

5. The short milk tube of claim 1, wherein the vent passage includes a first portion with a first vent diameter and a second portion with a second vent diameter.

6. The short milk tube of claim 1, wherein the vent passage includes a first portion with a first vent diameter adjacent to a cap end, and a second portion with a second vent diameter adjacent to a barbed end, and the second vent diameter is larger than the first vent diameter.

7. The short milk tube of claim 1, and further comprising:
   a vent plug seat lip extending outwardly above the wall to a first dimension and at least partially engaged with the vent plug cap.

8. The short milk tube of claim 1, and further comprising:
   a vent plug seat lip extending outwardly above the wall to a first dimension and at least partially engaged with the vent plug cap, and wherein the cap includes a debris barrier at least partially surrounding the vent passage and extending away from the cap to the first dimension.

9. The short milk tube of claim 1, and wherein the wall further defines:
   an interior vent plug recess defined in an inner wall surface, and the vent plug barbed end is at least partially disposed in the interior vent plug recess.

10. The short milk tube of claim 1, wherein:
    the wall defines an exterior vent seat in which the cap is at least partially disposed, and an interior vent seat in which the barbed end is at least partially disposed.

11. The short milk tube of claim 1, wherein:
    the wall defines an exterior vent seat in which the cap is at least partially disposed, and
    an interior vent seat in which the barbed end is at least partially disposed, and
    the interior vent seat defines an upstream flow channel.

12. The short milk tube of claim 1, wherein the wall defines an inner wall surface defining:
    an upstream transition channel; and
    an interior vent plug seat downstream from the upstream transition channel.

13. The short milk tube of claim 1, wherein the wall defines an inner wall surface defining:
    a downstream transition channel; and
    an interior vent plug seat upstream from the downstream transition channel.

14. The short milk tube of claim 1, wherein the wall defines an inner wall surface defining:
    an upstream transition channel;
    a downstream transition channel; and
    an interior vent plug seat disposed between the upstream transition channel and the downstream transition channel.

15. A vent plug for a short milk tube barrel having a wall with an upstream end and a downstream end and defining a milk passage bore, and the wall defines a vent plug mounting hole into the milk passage bore, the vent plug comprising:
    a cap, a shaft joined to the cap, and a barbed end joined to the shaft, and defining a vent passage to at least partially vent the milk passage bore and a flow dimple defined by the barbed end and disposed to be positioned in the milk passage bore, wherein the flow dimple is an oval-shaped recess with rounded shoulders, and wherein the flow dimple is disposed adjacent to the vent passage and provides no fluid conduction path between the barbed end and the cap.

16. The vent plug of claim 15, wherein the vent plug cap includes a debris dome extending away from the shaft and through which the vent passage extends.

17. The vent plug of claim 15, wherein the flow dimple is at least partially defined by rounded shoulders.

18. The vent plug of claim 15, wherein the barbed end further defines a second flow dimple spaced apart from the flow dimple and disposed to be positioned in a milk passage bore.

19. The vent plug of claim 15, wherein the barbed end further defines a plurality of additional flow dimples spaced apart from one another.

20. The vent plug of claim 15, wherein the shaft includes a fillet adjacent to the cap.

21. The vent plug of claim 15, wherein the vent passage includes a first portion with a first flow diameter and a section portion with a second flow diameter.

22. The vent plug claim 15, wherein the vent passage includes a first portion with a first flow diameter adjacent to a cap end, and a second portion with a second flow diameter adjacent to a barbed end.

\* \* \* \* \*